United States Patent [19]

Winkelmann et al.

[11] 4,153,775
[45] May 8, 1979

[54] SELF-CROSSLINKABLE POLYURETHANES

[75] Inventors: Hans D. Winkelmann; Karlheinz Wolf, both of Cologne; Harald Oertel, Odenthal-Gloebusch; Norbert Weimann, Leverkusen, all of Fed. Rep. of Germany

[73] Assignee: Bayer Aktiengesellschaft, Leverkusen, Fed. Rep. of Germany

[21] Appl. No.: 879,504

[22] Filed: Feb. 21, 1978

[30] Foreign Application Priority Data

Feb. 23, 1977 [DE] Fed. Rep. of Germany ....... 2707659

[51] Int. Cl.² .................. C08G 18/80; C08G 18/32
[52] U.S. Cl. .................. 528/45; 260/30.4 N; 260/32.6 NR; 260/33.6 UB; 260/33.8 UB; 528/44; 528/906
[58] Field of Search ............ 260/75 NP, 77.5 AM, 260/77.5 TB, 75 NQ, 77.5 AQ; 528/45, 53, 85

[56] References Cited

U.S. PATENT DOCUMENTS

| | | |
|---|---|---|
| 3,415,768 | 12/1968 | Dieterich et al. ........... 260/77.5 AQ |
| 3,726,838 | 4/1973 | Eimer et al. ................. 260/77.5 AQ |
| 3,795,642 | 3/1974 | Tefertiller et al. ......... 260/77.5 AM |
| 3,796,678 | 3/1974 | Bartizal ........................... 260/75 NQ |
| 3,935,146 | 1/1976 | Noll et al. ....................... 260/75 NQ |
| 4,070,345 | 1/1978 | Winkelmann et al. ..... 260/77.5 AM |

*Primary Examiner*—H. S. Cockeram
*Attorney, Agent, or Firm*—Plumley and Tyner

[57] ABSTRACT

Process for the production of solutions of segmented self-crosslinkable polyurethanes by incorporating in the polymer chain segments of the general formula

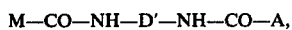

M—CO—NH—D'—NH—CO—A, wherein D' is the divalent residue of an organic diisocyanate; M is a diol containing residue derived by reaction of the active N-hydrogen of an aminodiol or a hydrazinodiol which contains a primary or secondary amino group, with an isocyanate group; and A is an isocyanate masking group.

16 Claims, No Drawings

SELF-CROSSLINKABLE POLYURETHANES

This invention relates to solutions of segmented, self-crosslinkable polyurethanes, to self-crosslinkable and/or self-crosslinked polyurethane moulded products produced from them, and to a process for their production.

So-called segmented polyurethane elastomers, which have a substantially linear structure, have recently become very important. They are preferably used in the form of their solutions in highly polar solvents and have gained a position of special importance for the spinning of polyurethane elastomer fibres, the coating of textiles, the manufacture of foils and the production of microporous foils or synthetic leather products.

The high demands made on such materials, particularly on elastomer fibres, can only be fulfilled by suitable choice of the starting materials and the reaction parameters. In this choice, the "segment structure" of the substantially linear polyurethanes plays an important part. The stretchability, for example, depends mainly on the longer chain "soft segments" (dihydroxy compounds) while the softening and melting range, the resistance to tension at elevated temperatures or in hot water, the elastic modulus and the mechanical strength depend mainly on the so-called "hard segments" composed of diisocyanates and chain lengthening agents (see Chemiker-Zeitung 98, (1974), pages 344–355). Symmetry of the hard segments and optimum physical aggregation between numerous individual hard segments via hydrogen bonds (hydrogen-bridge cross-linkages) are essential for obtaining elastomeric properties.

The "physical cross-linkage" via hydrogen bonds can easily be dissolved, for example by means of highly polar solvents (e.g. dimethyl formamide) which have a solvating effect on the hard segments, and the binding force also decreases relatively rapidly with increasing temperatures.

Various attempts have therefore been made to improve the properties of the elastomers by additional chemical crosslinking, e.g. by the addition of polyisocyanates, polyethyleneimine derivatives, epoxides or polyformaldehyde derivatives such as polymethylol or polymethylolether derivatives. It was found that subsequent chemical crosslinking of the polyurethanes can be achieved by the addition of the above mentioned compounds, and that the elastomers are thereby rendered insoluble and in some cases certain elastic properties are improved, but that this treatment has a deleterious effect on properties which are more important for the practical application of the products, particularly the thermal and hydrothermal properties. Moreover, the temperatures required to effect the crosslinking reactions are in some cases too high for practical purposes or the velocity of crosslinking too low.

Particularly important properties for practical applications include, for example, the behaviour of filaments under tension or their stretching in hot water, for example under the conditions of dyeing and finishing processes. This also includes the range of "creep" of filaments under a given tension at high temperatures, e.g. under the conditions of the thermofixing process, as well as the behaviour of filaments in elastic woven fabrics under the conditions of "thermal shaping" where they are highly stretched at high temperatures.

This new technique, which is employed, for example, for shaping brassiere cups of polyamide/elasthan knitted fabrics by heat (at about 190° to 195° C.) instead of sewing them, makes especially critical demands on the thermal properties of elastomer filaments.

It is an object of the present invention to provide improved polyurethane elastomers and elastomer filaments which (a) are chemically crosslinked or self-crosslinkable, (b) contain the crosslinking group in a particular form and therefore have a much more favourable effect on the thermal and hydrothermal properties than crosslinking agents which are added in accordance with the known art, (c) have an improved capacity to be shaped by heat, and (d) have improved resistance to hydrolysis, improved solvent resistance, improved resistance to thermal degradation and, where necessary, reduced surface tack.

Another object of this invention is, that the crosslinking reactions with the urethane or, preferably, urea segments can be readily effected by heat and do not require the presence of specific groups (e.g. tertiary amines), and the effects of cross-linkages (e.g. insolubility of the products) can be obtained with smaller quantities of crosslinking groups than are required when crosslinking groups are added in the form of external crosslinking agents.

It is a further object of this invention to provide self-crosslinkable polyurethanes as stable solutions.

Further objects which have been desired and achieved will emerge from the description and examples.

This invention provides a process for the preparation of solutions of polyurethanes which are crosslinkable through masked isocyanate groups, or the production of polyurethane moulded products crosslinked through masked isocyanate groups, by the reaction of a substantially linear isocyanate prepolymer obtained from longer chain dihydroxy compounds with a molecular weight of about 600 to 6000, optionally together with low molecular weight diols, and excess quantities of organic diisocyanates, chain lengthening in solvents with low molecular weight compounds such as diols or water but in particular compounds with molecular weights from 32 to about 400 which have NH-active end groups such as diamines, aminoalcohols, dihydrazide compounds or hydrazine, and optionally conversion of the solution into shaped products and release of the crosslinking reaction by heat, characterised in that isocyanate adduct diols represented by the following formula:

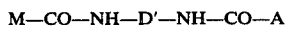

M—CO—NH—D'—NH—CO—A wherein

M is derived from an aminodiol or a hydrazinodiol,

D' represents the divalent radical of an organic diisocyanate, and

A is an isocyanate masking group, are built into the isocyanate prepolymer in quantities of from 0.1 to 10% by weight, preferably from 0.25 to 5.0% by weight, based on the solids content, the chain lengthening reactions are carried out with this modified isocyanate prepolymer, and, if desired, the shaped products are formed from the resulting solution and crosslinked during or after the shaping process.

This invention also provides solutions of self-crosslinkable polyurethanes obtained by reacting a substantially linear isocyanate prepolymer obtained from longer chain dihydroxy compounds with a molecular weight of about 600 to 6000, optionally together with low molecular weight diols and excess quantities of organic diisocyanates, and chain lengthening in solvents with low molecular weight compounds such as diols or water but in particular compounds having molecular weights from 32 to about 400 which contain NH-active end groups, such as diamines, aminoalcohols, dihydrazide compounds or hydrazine, characterised in that the polyurethanes contain, built into the isocyanate prepolymer, isocyanate adduct diols represented by the following formula:

M—CO—NH—D'—NH—CO—A wherein
M is derived from an aminodiol or a hydrazinodiol
D' represents the divalent radical of an organic diisocyanate, and
A is an isocyanate masking group,
in quantities of 0.1 to 10% by weight, preferably 0.25 to 5.0% by weight, based on the solids content.

The resulting solutions can be worked up into self-crosslinked polyurethane shaped products in the form of filaments, foils or coatings.

The invention therefore also provides self-crosslinked polyurethane shaped products in the form of filaments, foils or coatings produced by reacting a substantially linear isocyanate prepolymer obtained from longer chain dihydroxy compounds with molecular weights of about 600 to 6000, optionally together with low molecular weight diols, and excess quantities of organic diisocyanates, chain lengthening in solvents with low molecular weight compounds such as diols or water but in particular compounds with molecular weights from 32 to about 400 containing NH-active end groups, such as diamines, aminoalcohols, dihydrazide compounds or hydrazine, and converting the solution into shaped products, characterised in that they contain, built into the isocyanate prepolymer, isocyanate adduct diols represented by the following formula:

M—CO—NH—D'—NH—CO—A wherein
M is derived from an aminodiol or a hydrazinodiol,
D' represents the divalent radical of an organic diisocyanate, and
A is an isocyanate masking group,
in quantities of from 0.1 to 10% by weight, preferably from 0.25 to 5.0% by weight, based on the solids content, and crosslinking is effected by heat after the solution has been converted into shaped products.

The marked improvement in the properties of shaped products produced by the process according to the invention may possibly be explained by the fact that crosslinking between two linear, segmented polyurethane molecule chains takes place through branching or crosslinking points in different regions of the molecule. One potential crosslinking point, the diol derivative of the masked isocyanate group, is already built into the so-called "soft segment" in the so-called isocyanate prepolymer in a controllable form (see formula scheme A) while the other crosslinking point is obtained from the reaction of the isocyanate masking group with, in most cases, the "urea hard segment". A crosslinking reaction is thus achieved by preferential reaction with only one hard segment.

The possibility of the masked isocyanate group reacting to a minor extent with urethane groups within the soft segment cannot be completely excluded. Such a reaction exclusively results in crosslinking between soft segments, which is in itself particularly desirable.

The conventional addition of diisocyanates or polyisocyanates or of masked polyisocyanates, however, leads to chemical reactions in two or more different hard segments. Both the statistic distribution of the crosslinking points obtained in this case and the large number of chemical substitutions in several hard segments are less advantageous. This chemical substitution evidently is liable to interfere so badly with the physical "crosslinking" across hydrogen bonds that the advantage obtained by the increase in the number of chemical crosslinking bonds is more than offset by the reduction in the number of physical crosslinking bonds. This manifests itself in a deterioration in some of the properties.

The incorporation of diol derivatives of masked isocyanates (A) into the soft segment of the isocyanate prepolymers can be carried out in the course of the normal procedure for the preparation of the prepolymer, for example by adding the diol derivatives of the masked isocyanates during the reaction of the higher molecular weight dihydroxy compounds.

HO—G—OH (G=the residue of the higher molecular weight dihydroxy compound) with excess quantities of diisocyanates

OCN—D—NCO (D=residue of the diisocyanate) to form the isocyanate prepolymer represented by the idealised structure in the formula scheme A:

Formula Scheme A (a) Isocyanate prepolymer formation with incorporation of the crosslinker diol

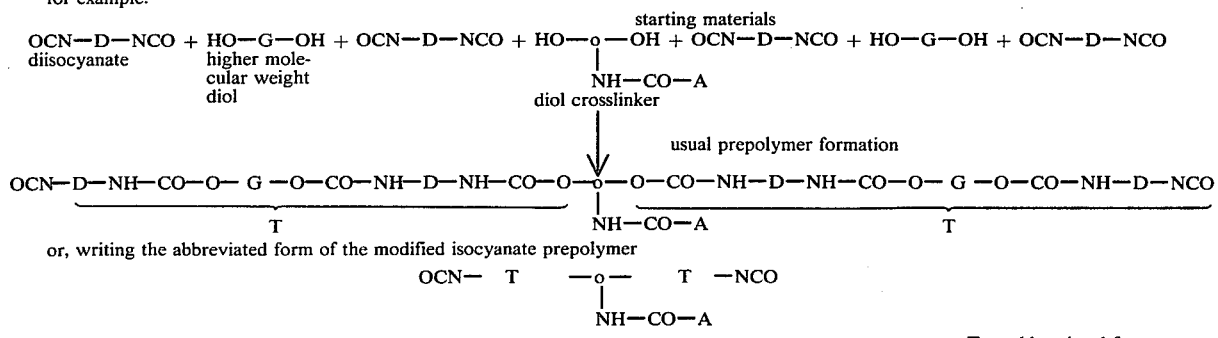

Formula Scheme A-continued (b) Chain lengthening of the isocyanate prepolymer with NH-functional chain lengthening agents: $H_2N\text{-}\gamma\text{-}NH_2$ (1:1)

↓

$$\left[\begin{array}{c}\text{T}\underset{\underset{\text{modified soft}}{\text{NH-CO-A}}}{-\text{o}-}\text{T}-\text{NH-CO-NH-Y-NH-CO-NH}\end{array}\right]_n \quad (Y = \text{residue of chain lengthening agent})$$

modified soft segment — hard segment

Segmented polyurethane(urea) polymer

---

The modified isocyanate prepolymer which is capable of being crosslinked behaves in virtually the same way as an unmodified isocyanate prepolymer. The chain lengthening reaction, for example with diamines, results in the formation of the typical hard segment:

$$-\text{NH-CO-NH-Y-NH-CO-NH-}$$

which, by its interaction with a large number of adjacent hard segments through hydrogen bonds, forms blocks of hard segments which are physically crosslinked with each other and in this way gives rise to the typical elastic properties in the polymer.

This hard segment is the preferred point of attack for chemical crosslinking with the masked isocyanate group.

The isocyanate adduct diols represented by the general formula:

$$\text{M-CO-NH-D'-NH-CO-A}$$

which can be built into the molecule are preferably those in which M represents the following group:

$$\text{HO-}R_1\underset{\underset{|}{(NH)_x}}{-N-}R_2\text{-OH}$$

wherein $R_1$ and $R_2$ may be identical or different and represent a straight chain or branched alkylene group having up to 12 C-atoms or a cycloalkylene group, and $x$ represents 0 or 1.

Crosslinking groups represented by the following general formula:

$$\text{M-CO-NH-D'-NH-CO-A}$$

wherein M represents a group of the formula:

$$\text{HO-}R_1\underset{\underset{|}{(NH)_x}}{-N-}R_2\text{-OH}$$

wherein $R_1$ represents the group $$-\underset{\underset{R_3}{|}}{\text{CH}}-\text{CH}_2-$$

wherein
$R_3$ = hydrogen or $C_1$-$C_3$-alkyl, in particular methyl,
$R_2$ represents a straight chain or branched alkylene group having up to 12 C-atoms or a cycloalkylene group, and
$x$ represents 0, are particularly suitable.

The preferred crosslinking agents also include those represented by the general formula:

$$\text{M-CO-NH-D'-NH-CO-A},$$

wherein M represents a group of the following formula:

$$\text{HO-}R_1\underset{\underset{|}{\underset{|}{N-R_4}}}{\overset{\overset{R_4}{|}}{-C-}}R_2\text{-OH}$$

wherein $R_1$ and $R_2$ may be identical or different and represent a straight chain or branched alkylene group having up to 12 C-atoms or a cycloalkylene group, and $R_4$ represents hydrogen and/or a $C_1$-$C_4$ alkyl group, in particular methyl.

The isocyanate adduct diols used according to the invention basically consist of the following components:

(1) Aminodiols or hydrazino-diols,
(2) organic diisocyanates OCN—D'—NCO, and
(3) "masking groups" AH.

The aminodiols or hydrazino-diols used may in principle be any diols which have another secondary or primary amino group.

One readily available group is the alkoxylation products of ammonia or hydrazine:

$$\text{HO-}R_1\underset{\underset{}{|}}{\overset{\overset{H}{|}}{-N-}}R_2\text{-OH or}$$

$$\text{HO-}R_1\underset{\underset{}{NH_2}}{-N-}R_2\text{-OH},$$

the following being preferred examples: bis-($\beta$-hydroxyethyl)-amine, bis-($\beta$-hydroxypropyl)-amine, ($\beta$-hydroxyethyl)-$\beta$-hydroxypropylamine, bis-($\beta$-hydroxybutyl)-amine, N,N-bis-($\beta$-hydroxyethyl)-hydrazine, N,N-bis-($\beta$-hydroxypropyl)-hydrazine and N,N-bis-($\beta$-hydroxybutyl)-hydrazine.

The monoalkoxylation products of aminoalkanols or aminocycloalkanols, for example, are also suitable, preferably those of the following formula:

$$\text{HO-}\underset{\underset{R_3}{|}}{\text{CH}}\text{-CH}_2\text{-N-}R_2\text{-OH}$$
$$\phantom{\text{HO-CH-CH}_2\text{-}}H$$

wherein $R_3$ and $R_2$ have the meanings indicated above.
The following are particularly suitable:
4-N-($\beta$-hydroxyethyl)-amino-butanol-1;
6-N-($\beta$-hydroxyethyl)-amino-hexanol-1;

6-N-(β-hydroxypropyl)-amino-hexanol-1;
12-N-(β-hydroxyethyl)-amino-dodecanol-1;
4-N-(β-hydroxyethyl)-amino-cyclohexanol-1;
3-N-(β-hydroxyethyl)-amino-cyclohexanol-1;
and also other amino derivatives of diols, preferably those represented by the following formula:

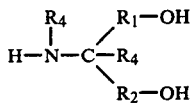

wherein $R_1$, $R_2$ and $R_4$ have the meanings indicated above.

The following, for example, are preferably used:
2-amino-propanediol-1,3;
2-methylamino-propanediol-1,3;
2-amino-2-methyl-propanediol-1,3;
2-amino-2-ethyl-propanediol-1,3;
3-amino-pentanediol-2,4;
2-amino-pentanediol-1,5; and
3-amino-2,5-dimethyl-hexanediol-2,5.

The organic diisocyanates OCN—D'—NCO may be any aliphatic or cycloaliphatic diisocyanates but are preferably aromatic diisocyanates, for example the following: diphenylmethane-4,4'-diisocyanate, tolylene-2,4-diisocyanate, tolylene-2,6-diisocyanate, phenylene-1,3-diisocyanate, phenylene-1,4-diisocyanate, diphenylether-4,4'-diisocyanate and others, but diphenylmethane diisocyanates and tolylene diisocyanates are preferred.

The masking compounds A–H may be any compounds whose addition products with isocyanates have a low thermal stability. Compounds of this kind include, for example, phenols, acetoacetic esters, malonic esters, acetylacetone, phthalimide, benzenesulphonamide, 2-mercaptobenzothiazole and hydrocyanic acid (see Kunststoff-Handbuch, Volume VII, Polyurethane, pages 11 to 14, Carl-Hanser-Verlag, Munich, 1966). One preferred class of compounds which are particularly suitable for the present purpose are the lactams, for example pyrrolidone or α-piperidone or caprolactam derivatives (for example ε-caprolactam, and the methylcaprolactam isomers, for example γ-ethylcaprolactam or γ-tert.-butyl caprolactam). ε-Caprolactam itself is particularly preferred.

The exceptional suitability of caprolactam was surprising since this compound is normally considered to have a relatively high decomposition temperature (see High Polymers - Volume XVI - J. H. Saunders, K. C. Frisch, Polyurethanes Part I Chemistry, page 120; Interscience Publishers, 1962.)

The ease with which crosslinking can be achieved according to the invention lies in the particular form in which the diols of the type used according to the invention are built into the structure of the molecule. Much more favourable crosslinking conditions are thereby obtained than if bis-caprolactam crosslinking agents (diisocyanates+2×caprolactam) are added in accordance with the state of the art.

The novel diol derivatives of masked isocyanates, or isocyanate-masking group-diols, may be prepared by various methods (see also preparation Examples 1, 2 and 5).

For example, a bis-adduct may first be prepared from the diisocyanate and 2 mols of masking compound (see, for example, formula I in preparation Example 1), and one of the masking groups may then be replaced by reaction with one equivalent of a monoaminodiol (for example II). The desired compound is then generally freed from I or from the tetrakis-hydroxy derivative (see for example IX) by crystallisation.

Another method of obtaining these compounds is the process described in Example 5, for example.

In this method, an isocyanate group is reacted with one equivalent of caprolactam to form the monoadduct isocyanate (VI), which is converted to the desired end product (for example VII or VIII) by reaction with an equivalent quantity of aminodiol.

The higher molecular weight dihydroxy compounds used for the synthesis of the polyurethanes have molecular weights of from about 600 to 6000, preferably from 1000 to 3000, and may be, for example, polyesters, polyethers, polylactone esters, polyacetals, polycarbonates, mixtures of these groups or condensates of these groups, e.g. polyester ethers, polyester lactone esters, polycarbonate esters and others, with melting points preferably below 60° C. and most preferably below 50° C., of the kind which have been numerously described for the synthesis of such segmented polyurethane (urea)elastomers.

Examples of such compounds include the adipic acid esters of 1,6-hexanediol, 2,2-dimethylpropanediol, 1,4-butanediol, 1,2-propylene glycol and ethylene glycol, and polyesters of mixtures of diols used to lower the melting point in the polyester. Polypropylene glycol ethers and particularly polytetramethylene glycol ethers give rise to products which are very resistant to hydrolysis. Polycaprolactone esters or mixed esters and hexanediol polycarbonates or mixed polycarbonates as well as adipic copolyesters with long chain diols (e.g. 1,6-hexanediol) are particularly preferred on account of their high resistance to hydrolysis.

Diols which contain tertiary amine groups, such as N-methyl-N,N-bis-(β-hydroxyethylamine) or N-methyl-N,N-bis-(β-hydroxypropylamine) may be used in quantities of from about 0.03 to 0.25 mol/kg for isocyanate prepolymer formation in order to improve the dye absorption capacity (see German Offenlegungsschrift No. 1,495,830).

The organic diisocyanates used may be the usual diisocyanates or their structural analogues but the preferred diisocyanates are diphenylmethane-4,4'-diisocyanate, the isomeric tolylenediisocyanates, diphenylether-4,4'-diisocyanate, 1,6-hexanediisocyanate, dicyclohexylmethane-4,4-diisocyanate and 3-isocyanatomethyl-3,5,5-trimethylcyclohexylisocyanate.

The diisocyanates are reacted in excess quantities with the hydroxyl compounds to form the isocyanate prepolymers, preferably in a molar ratio of OH to NCO of between about 1:1.35 and about 1:3.0. The isocyanate prepolymer preferably has an isocyanate content of about 1.8 to 4.0% in the prepolymer solid substance.

Formation of the isocyanate prepolymer from its starting components, including the diol component I according to the invention, may be carried out by basically known methods, either solvent-free or, preferably, in solvents.

For example, all the components may be reacted together at the same time in solvents such as chlorobenzene, toluene or dioxane but preferably in highly polar dimethyl formamide or dimethylacetamide at temperatures of from about 20° C. to about 100° C. to form the prepolyme. Alternatively, an isocyanate prepolymer may first be formed (partly or completely) from a longer chain dihydroxy compound, and the isocyanate adduct diol may be reacted at a later stage to form the ultimate isocyanate prepolymer containing the built-in diol. The statistic form of distribution within the isocyanate prepolymer can be influenced according to which method is adopted.

According to the invention, the quantities of isocyanate adduct diols used in the reaction for forming the prepolymer are calculated so that about 0.1 to 10% by weight of diols (based on the prepolymer solid substance), preferably 0.25 to 5.0% by weight, are built into the prepolymer. Since the weight of chain-lengthening agent is of minor importance, it may be assumed that approximately the same quantity thereof is built in, based on the quantity of segmented poly(urea)urethane elastomer. One factor which is a useful measure of the crosslinking density is the mVal/kg of NH—CO—A groups, since this indicates the equivalence of crosslinker groups which have been built in. The polyurethane should contain approximately 5 to 500 mVal, preferably 20 to 200 mVal of crosslinker equivalents (see Examples). If the quantity of crosslinking groups is too small, the crosslinking reaction obviously will not be released sufficiently, but too large a quantity of crosslinking groups is also a disadvantage because it alters many of the properties (e.g. elongation at break and modulus). It is therefore particularly advantageous to incorporate approximately 25 to 150 mVal of masked isocyanate groups per kg of polyurethane.

The prepolymer formation reaction is preferably carried out in dimethylformamide or dimethylacetamide as solvent and at reaction temperatures of about 20° to 60°C. for about 20 to 200 minutes.

The resulting isocyanate prepolymer modified by the structural incorporation according to the invention is then reacted by the usual, known methods of chain lengthening with approximately equivalent quantities of bifunctional N—H—active compounds in highly polar solvents such as dimethylformamide, dimethylacetamide or dimethylsulphoxide to produce highly viscous solutions of poly(urea)urethanes. So-called bifunctional soft solvents, e.g. toluene/isopropanol mixtures, may be used if 3-isocyanatomethyl-3,5,5-trimethyl-cyclohexane isocyanate is used almost exclusively.

The H-reactive chain-lengthening agents used may be glycols or water, but are preferably compounds with molecular weights of from 32 to about 400 in which the isocyanate-reactive hydrogen atom is attached to a nitrogen atom and which correspond to the formula N₂H—Y—NH₂ wherein Y = a single bond (→hydrazine), Y = a divalent aliphatic, cycloaliphatic, aromatic, araliphatic or heterocyclic group Z (→diamines), Y = the group

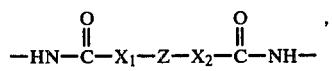

wherein

Z has the meaning defined above and

X₁ and/or X₂ represent, independently of each other, a single bond, or —O— or —NH— (i.e. →dihydrazides, dicarbazic esters, disemicarbazides, semicarbazide hydrazide, etc.), Y = the group

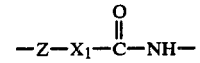

(where Z and X₁ have the meaning indicated above), i.e. →aminohydrazides of aminosemicarbazides, or Y = —NH—CO—NH— (→carbodihydrazide).

The following are examples of such chain-lengthening agents H₂N—Y—NH₂: hydrazine or hydrazine hydrate (see German Patent No. 1,161,007); primary and/or secondary aliphatic, cycloaliphatic aromatic or heterocyclic diamines, preferably ethylene diamine and 1,3-diaminocyclohexane, 1,2-propylenediamine and/or m-xylylene diamine (see German Patent No. 1,223,154; U.S. Pat. Nos. 2,929,804 and 2,929,803; German Auslegeschrift No. 1,494,714); aminoalcohols, e.g. aminoethanol and 4-aminocyclohexanol; dihydrazides, e.g. carbodihydrazide; adipic acid hydrazide (see German Patents Nos. 1,123,467 and 1,157,386); aminocarboxylic acid hydrazides such as aminoacetic acid hydrazide or β-aminopropionic acid hydrazide (see German Auslegeschrift No. 1,301,569); semicarbazidohydrazides, e.g. α-semicarbazido-acetic acid hydrazide or β-semicarbazidopropionic acid hydrazide (see German Patent No. 1,770,591); or other known NH compounds of the kind described above and, for example, also in German Offenlegungsschrift No. 2,025,616.

The particularly preferred chain-lengthening agents, however, are ethylene diamine, propylene-1,2-diamine, hydrazine, β-aminopropionic acid hydrazide and β-semicarbazidopropionic acid hydrazide; minor quantities of so-called "co-chain-lengthening agents" may also be added to modify the properties (e.g. small quantities of 1,3-diaminocyclohexane or water in addition to ethylene diamine used as the main chain-lengthening agent).

Minor quantities of monofunctional amino compounds such as monoamines (diethylamine) and monohydrazide derivatives (acetic hydrazide, picolinic acid hydrazide or butyl semicarbazide) as well as asymmetric dimethylhydrazine may, of course, also be used as well as very small quantities of trifunctional compounds (for example, 1,5,11-triaminoundecane) in order to increase the functionality (viscosity).

The highly viscous elastomer solutions obtained can be converted into shaped products by the usual methods, e.g. highly elastic films and foils can be obtained by painting the elastomer solutions on supports and evaporating off the solvent; textile coatings can be obtained by application to textile surfaces with doctor wipers; microporous foils for use as synthetic leathers may be obtained by coagulation of the solutions (optionally with the addition of non-solvents), but a preferred and particularly important application is the spinning of the solutions to form elastomer threads.

One advantage of the self-crosslinkable polyurethane systems according to the invention is that in wet coagulation or wet spinning processes there is no risk of the crosslinking group being washed out with the solvent or reduced in its concentration. This is particularly important in coagulation processes for synthetic leather, where coagulation in dimethylformamide-water mixtures followed by washing would lead to a loss of crosslinking agents added externally.

Another particular advantage of the invention is that the solution which contains the self-crosslinkable polyurethanes is very resistant to premature, unwanted crosslinking of the polyurethanes while they are still in solution. The solutions can be kept for weeks in an uncrosslinked state ready for processing. In some cases, even the shaped polyurethane products produced from them can be obtained in an uncrosslinked state. Elastomer threads, for example, can be spun and worked up in the still uncrosslinked state. It is only in the specific step employed for application of the product, e.g. the thermal shaping of the knitted products produced from polyamide/elasthan filaments, that the crosslinking reaction is released at the appropriate temperature and prevents, for example, degradation or tearing of the thread in the fabric.

Depending on the conditions under which shaping is carried out (particularly the shaping temperatures), the shaped products obtained are either still uncrosslinked (at low temperatures, say below 100° to 110° C.) or partly or completely crosslinked (at high temperatures and/or prolonged heating times). The crosslinking reaction is generally controlled to adjust it to the process and to the desired purpose of the end product.

The final heating may be carried out relatively slowly, for example on spools at about 120° to 150° C. for 20 to 120 minutes, or it may be carried out more rapidly, e.g. in the case of coatings heated in drying channels, at about 130° to 180° C. for one to five minutes, or on high temperature treatment apparatus such as heating rollers or heating grids, where the products may be exposed to surface temperatures or air temperatures of, for example, 160° to 250° C. for short periods of about 0.1 to 10 seconds. Where the heating times are very short, even higher temperatures may be employed (e.g. in infra-red heaters).

Catalysts may be employed for accelerating the crosslinking reaction but are not necessary. Any of the known accelerators for isocyanate reactions may be employed in the usual quantities for this purpose.

Explanation of the measuring techniques and measuring procedures given in the Examples.

The parts given in the Examples are parts by weight unless otherwise indicated.

The molecular weight of the polyurethane elastomer is indicated by the $(\eta)_i$-value, the so-called inherent viscosity:

$$(\eta)_i = \ln \eta r / c$$

where $\eta r$ is the relative viscosity of a solution of the polymer in hexamethylphosphoramide at 20° C. and c is the concentration in g/100 ml of solution. The values were determined at c=1.

A high $\eta_i$-value or insolubility of the moulded product (corresponding to $\eta_i \to \infty$) indicates a high resistance to thermal degradation such as is required for thermofixing processes and particularly for the thermal shaping processes already described above.

The elastic properties of the filaments and foils were tested by the methods described in Belgian Patent No. 734,194. The elongation at break was measured in a tearing machine, in which the length of sample clamped into the machine was controlled by a light barrier and allowance was made for the amount of slippage in the clamp.

The elastic values are given in terms of the modulus at 300% (in the first elongation curve), the modulus at 150% (in the third return curve) and the permanent elongation (after 3×300% at elongation rates of 400% per minute, measured 30 seconds after release of the load).

Determination of hot-water extension

A piece of thread 50 mm in length is stretched by a stretching device controlled by a force-measuring head until a contraction tension of 0.25 mN/dtex has been produced in the thread. If necessary, this tension is maintained by continuously increasing the stretching force, and the extension is determined after a loading time of 25 minutes in air (first value). The thread under tension is then immersed in water at 95° C. while the load is maintained, and the total extension produced after a further 25 minutes under load in water is read off (second value). In the third stage, the thread under tension is removed from the water and the load is removed until the thread is just free from tension, and the residual elongation is measured (third value). All the measurements are given as percentages of the length of thread clamped into the apparatus, in accordance with the following scheme:

| 1st Value<br>Extension in air<br>at 20° C. after<br>25 minutes<br>loading of<br>$0.25 \frac{mN}{dtex}$<br>[%] | 2nd value<br>Extension in water<br>at 95° C. after<br>25 minutes<br>loading of<br>$0.25 \frac{mN}{dtex}$<br>[%] | 34d value<br>Residual elongation after<br>complete removal<br>of load in air at<br>20° C.<br>[%] |
|---|---|---|

The smaller the second value (elongation in hot water in relation to the first value) and the smaller the third value (permanent elongation after removal of load), the better are the hydrothermal properties.

Determination of the reduction in tension in hot water (RTHW) of elastomer threads A piece of thread clamped over a length of 100 mm (pretensioning weight 0.009 mN/dtex) is stretched by 100% at 20° C. and the resulting tension in the thread (mN/dtex) is measured after 2 minutes (first value). The thread is then immersed in water at 95° C. while kept stretched by 100%, and the resulting tension after three minutes in water is determined (second value). After this measurement, the thread is removed from the water bath and kept at room temperature for 2 minutes. The prestretched thread still clamped in the apparatus is then relieved of load until free from tension, and the residual elongation is measured at once (third value). Scheme of results given in the Examples (abbreviation RTHW):

| Tension<br>in air at<br>20° C.<br>(mN/dtex) | RTHW<br>Tension<br>in H$_2$O<br>at 95° C.<br>(mN/dtex) | Residual<br>elongation<br>after removal<br>of load<br>(in %). |
|---|---|---|

The higher the second value (tension in hot water in mN/dtex) and the lower the third value (residual elongation after treatment in the tension-free state), the better are the hydrothermal properties.

Determination of the heat distortion temperature (HDT) of elastomer threads

The titre of elastomer threads which have been laid out for about 3 hours without tension under normal atmospheric conditions is determined (a piece of thread under a preliminary load of 0.003 mN/dtex is weighed). An elastomer thread clamped over a length of 250 mm under a preliminary load of 0.018 mN/dtex is suspended in a glass tube filled with nitrogen at room temperature. The tube is surrounded by a heating jacket through which flows silicone oil heated using a thermostat. The temperature in the tube is initially raised to about 125° C. in about 30 minutes. The temperature is subsequently raised at a rate of 2.1° C. per minute until the elastomer thread has undergone a change in length to more than 400 mm.

Temperature changes (along the abscissa) and elongation of the sample (along the ordinate) are recorded with an X-Y plotter with the axes of the graph drawn in proportion to each other so that a graph with a gradient of 45° C. is obtained when the relative change in length $\gamma$ is 0.8% per degree rise in temperature.

$$\frac{d}{dT} = 0.8 \frac{\text{percent}}{\text{degree}} \quad (\gamma = \frac{\text{change in length}}{\text{length of sample under load at room temperature}} \text{ in \%})$$

are obtained as when a loop of polyamide-6 filament is measured against a loop of elasthan filament (simulation of the stitches).

The behaviour of elasthan filaments under the process of shaping by heat (stretching of surface area by approximately 50 to 100%; shaping temperatures of about 180° to 200° C.) can be fairly closely correlated with the results of the HBT measurements obtained.

The following Examples are to further illustrate the invention without limiting it.

Example/Method of preparation (1)

74 g (0.5 mole) of N,N-bis-(2-hydroxypropyl)-hydrazine (II) and 0.5 parts of water are introduced into a solution of 476 g (1 mole) of the bis-caprolactam adduct (I) and 2 liters of toluene at 105° C. in accordance with the following reaction equation:

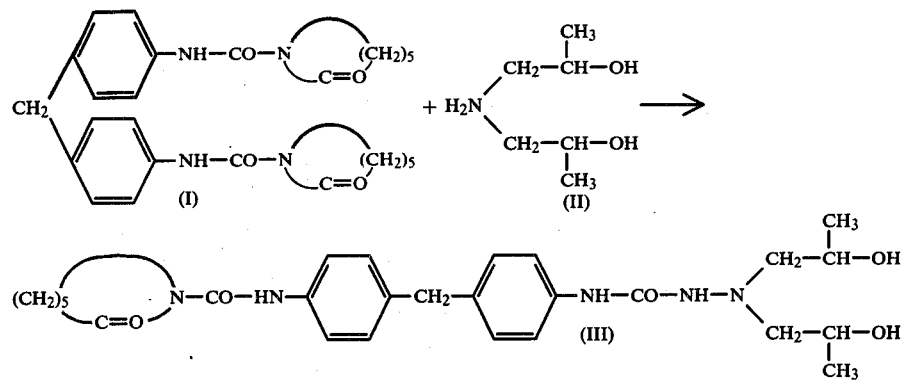

The heat distortion temperature (HDT) is that temperature which is read off the abscissa when a vertical line is dropped from the point of contact of the 45° tangent with the temperature/elongation curve.

The higher the heat distortion temperature, the higher is generally the thermal resistance of the elastomer.

Determination of the hot break time (HBT) of elastomer threads

A piece of elastomer thread is fixed between two clamps (distance 10 cm) and stretch by 100%. It is then placed in the stretched state on a chromium-plated metal plate 4 cm in width which has been preheated to 193° C. by thermostatically controlled heating. The thread either tears after a certain length of time or remains stable. After a measuring time of about 3 minutes, the test is stopped if the thread remains intact (result expressed as: >180 sec). The HBT-values are given in terms of the number of seconds (sec) at which the thread under tension is observed to break at 193° C.

This method of measurement has been developed from a process of simulating the behaviour of threads in a knitted fabric of polyamide and elasthan filaments. It was found that if the simplified method of measurement described above is employed, virtually the same results The solution is heated under reflux for 45 minutes, mixed with 2.5 liters of toluene and left in a refrigerator overnight.

The crystallisate obtained is separated by suction filtration, washed with a small quantity of cold toluene and freed from solvent adhering to it by evaporation under vacuum. The crude product (356 g) is stirred up in 1 liter of methanol at 40° to 45° C. and filtered from insoluble constituents of the starting material (I, 233 g, m.p. approx. 174° C.).

2.5 Parts of water are added to the filtrate, and the crystallisate (III) obtained after 24 hours is suction-filtered.

Yield: 104 g (33% of the theoretical yield), m.p. 151° to 154° C.

N Calculated: 13.69%
N Found: 13.57%.

The adduct (I) of 2 moles of caprolactam and 1 mole of diphenylmethane-4,4'-diisocyanate is obtained in a yield of 372 g in the form of a well crystallised substance melting at 178° to 180° C. by the reaction of 250 g of diisocyanate with 254 g of ε-caprolactam under $N_2$ in the melt at 100° C. (strongly exothermic reaction) and recrystallisation from boiling toluene.

The diol adduct (IV) represented by the following formula:

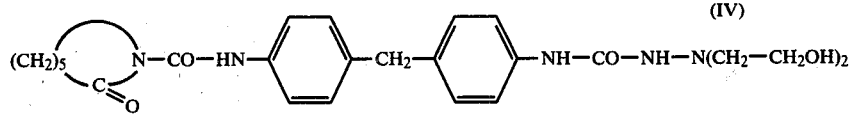

can be obtained in corresponding manner by the reaction of 1 mole of the bis-caprolactam adduct (I) with 1 mole of N,N-bis-2-hydroxyethylhydrazine.

Example/Method of preparation 2

238 g (0.50 mole) of the bis-caprolactam adduct (I) are dissolved in 1 liter of boiling toluene and heated under reflux with 26 g of diethanolamine (0.25 mole) and 0.25 ml of water for 45 minutes.

After cooling, the solvent is evaporated off under vacuum and the solid residue is stirred up with 1 liter of methanol at 40° to 45° C. The residue (bis-adduct I) is filtered off and the methanolic solution is precipitated in 1500 ml of water.

The residue is suspended in ether and digested. The remaining solid (V), m.p. 135° to 143° C., is recrystallised from chlorobenzene. M.p. 146°–148° C.

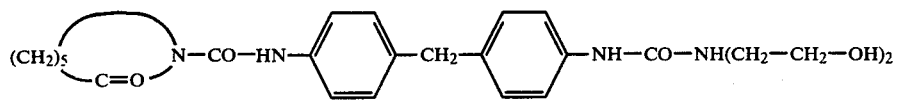

N Calculated: 11.95% O Calculated: 17.1%.
N Found: 11.82% O Found: 17.4%.

EXAMPLE 3

500 Parts of a polyester of hexane-1,6-diol, 2,2-dimethylpropane-1,3-diol and adipic acid (molar ratio of diols 65/35) having a molecular weight of 1875, 10.68 parts of N-methyl-bis-(β-hydroxypropyl)-amine, 37.2 parts of the diol-NCO-adduct (III) (corresponding to 100 mVal of the NCO/caprolactam-cross-linking group per kg of elastomer), 163.3 parts of diphenylmethane-4,4'-diisocyanate and 178 parts of dimethylformamide are reacted together for one hour at 50° C. to produce the isocyanate prepolymer (2.79% NCO in the solid substance).

6.85 Parts of ethylene diamine are dissolved in 1230 parts of dimethylformamide and converted into the carbamate suspension with 10 parts of dry ice. 400 Parts of the prepolymer solution are added to this carbamate suspension with vigorous stirring. An elastomer solution with a viscosity of 250 poises is thereby formed. 6 ml of a solution of 6.70 parts of hexane diisocyanate in 50 parts of dimethylformamide are added dropwise to this elastomer solution to produce a viscous, homogeneous elastomer solution with a viscosity of 445 poises. This elastomer solution is spun by the dry spinning process.

Portions of the solution are diluted to 16% and spun by the wet spinning process or applied by brush coating to form films. The films are still completely soluble after they have been dried for 30 minutes at 70° C. followed by 30 minutes at 100° C. When such a film is heated to 130° C. for 30 minutes, it becomes completely insoluble in dimethyl formamide, even when heated to 80° C.

The film has a mechanical strength of 0.64 cN/dtex, an elongation of 597%, a modulus at 300% elongation of 0.11 cN/dtex and a heat distortion temperature (HDT) of 190° C.

The wet-spun filaments, like the film, can be after-crosslinked by heat (for example for 30 minutes at 130° C.) and are thereby rendered insoluble in DMF.

When dry-spun elastomer filaments which have been after-treated on spools for one hour at 130° C. are tested, they are found to have become insoluble and to have a hot break time of more than 180 seconds and 193.7° C. and 100% elongation (the measurements are normally stopped at 180 seconds). If the test is continued, breaks do not occur even after 420 seconds. By contrast, elastomer filaments which are built up in the same way without the incorporation of cross-linking groups into the molecular structure break after only about 15 to 30 seconds.

The advantages of the crosslinking according to the invention are therefore to be seen both in the insolubility of the resulting products and, particularly, in the considerably improved hot break time.

EXAMPLE 4

400 Parts of the polyester described in Example 3 (molecular weight 1875), 8.29 parts of N-methyl-bis-(β-hydroxypropyl)-amine, 28.8 parts of the diol-NCO-adduct (III) (corresponding to approximately 100 mVal of NCO/Cl-crosslinking groups per kg of elastomer substance), 116.7 parts of diphenylmethane-4,4'-diisocyanate and 138 parts of dimethylformamide (DMF) are converted into the prepolymer by 85 minutes' heating at 40° to 43° C. (2.11% of NCO, based on the solid substance; this means that the prepolymer has a lower isocyanate group content than in Example 1 and the polyurethane therefore also contains fewer hard segments).

5.48 Parts of ethylene diamine in 1070 parts of dimethylformamide are converted into the carbamate ($H_3N^{\oplus}$—$CH_2$—$CH_2$—$COO^{\ominus}$) with 10 g of $CO_2$. The carbamate is reacted with 450 parts of the isocyanate prepolymer with stirring and diluted to a concentration of 20% (viscosity 242 poises) with 305 parts of dimethylformamide. The viscosity of the solution is raised to 415 poises by the addition of 1.14 parts of hexanediisocyanate in 10 parts of dimethyl formamide. The solution is dry spun (see below) or wet spun or dried on surfaces to form films (at 70°/100° C.).

Comparison Example

An isocyanate prepolymer is prepared by the method described in Example 4 but without the incorporation of the diol-crosslinker-adduct III (isocyanate content 2.10% NCO), and the chain-lengthening reaction is carried out with ethylene diamine. An elastomer solution having a viscosity of 661 poises at a concentration of 22% is obtained.

When films are cast from this solution and dried at 70°/100° C., the films from both solutions are still soluble in DMF. After a heat treatment at 130° C. for 30 minutes, the film obtained from the self-crosslinkable elastomer solution of Example 4 is insoluble in DMF while the film obtained according to the Comparison Example remains soluble.

When the solutions are spun by the wet spinning process in 90/10 minutes of water/DMF at 80° C. and the resulting filaments are dried for 20 minutes at 130° C., it is found that again only the self-crosslinkable substance according to the invention has become difficult to dissolve and the filament properties are considerably improved by the crosslinking reaction, particularly the thermal properties (for example the heat distortion temperature HDT and the hot break time at 193.7° C. and 100% elongation).

|  | Tensile strength cN/dtex | Elongation % | Permanent elongation % | HDT ° C. | Hot break time (seconds at 193.7° C. and 100% elongation) |
|---|---|---|---|---|---|
| according to the invention (Ex. 4) | 0.64 | 562 | 16 | 181 | ≧180 |
| Comparison experiment | 0.59 | 565 | 19 | 176 | 14.9 |

If, instead of III, the equivalent quantity of the diol-crosslinker-adduct IV is used in Example 4, the crosslinking and improvement in properties obtained are equally good.

EXAMPLE 4b

200 Parts of a polyester similar to that of Example 3 (molecular weight 1950), 12.48 parts of the monoadduct-diol IV (100 mVal of crosslinking groups per kg of elastomer), 49.26 parts of diphenylmethane-4,4'-diisocyanate and 66 parts of dimethylformamide are reacted together for 180 minutes at 42° C. to produce the isocyanate prepolymer (2.21% of NCO in the solid substance).

For the chain-lengthening reaction, 107.5 parts of the above isocyanate prepolymer solution are stirred into a suspension of 1.36 parts of ethylene diamine in 224 parts of dimethylformamide and 3 parts of solid carbon dioxide. A clear homogeneous elastomer solution having a viscosity of 346 poises is obtained.

Films formed from this solution (drying temperature 70 minutes/100° C.) are soluble in dimethylformamide. When they are after-heated (30 minutes at 130° C.), the films become insoluble in dimethylformamide and have a hot break time (HBT) of 208 seconds at 193.7° C./100% elongation. (Films which are free from crosslinking groups have hot break times of only about 15 seconds and remain soluble. When after-heated at 130° C., they even show a reduction in molecular weight of about 10%).

When the films which contain crosslinking groups but are still soluble (drying temperature 100° C. for 70 minutes) are tested for the hot break time, they undergo crosslinking in the course of the measurements and show a high heat distortion temperature (HDT) (for their relatively low isocyanate content) of 185° C.

Example/Method of preparation 5

113 parts of ε-caprolactam (CL), 174 parts of tolylene-2,4-diisocyanate and 420 parts of petroleum ether are dissolved at 50° C. and heated to 60° C. for 65 minutes. The solution progressively separates into two phases which are then separated from each other in a separating funnel. The lower layer is washed three times with 50 ml portions of petroleum ether and its isocyanate content is then determined by titration.

300 ml of acetone are added to this layer which contains the CL-monoadduct isocyanate (VI), and diethanolamine equivalent in quantity to the isocyanate content (based on the secondary amino group) is added dropwise with stirring and cooling with ice (reaction temperature kept below 20° C. by cooling). The solution is then poured into 1 liter of water to precipitate VII. The supernatant liquid is decanted off and the smeary precipitate is dried under vacuum at 40° to 50° C. 144 Parts of a white, pulverulent product VII are isolated. Melting point: 130° C. (sintering at 105° to 110° C.)

| Analysis (VII): | Calculated: | Found: |
|---|---|---|
|  | C 58.3 | 58.8% |
|  | N 14.3 | 14.3% |
|  | H 7.2 | 7.2% |
|  | O 20.2 | 19.8% |

If, instead of diethanolamine, an equivalent quantity of 2-amino-2-methyl-propanediol-(1,3) is used for the reaction with the CL-monoadduct-isocyanate VI, product VIII (m.p. 132° to 138° C.) is obtained.

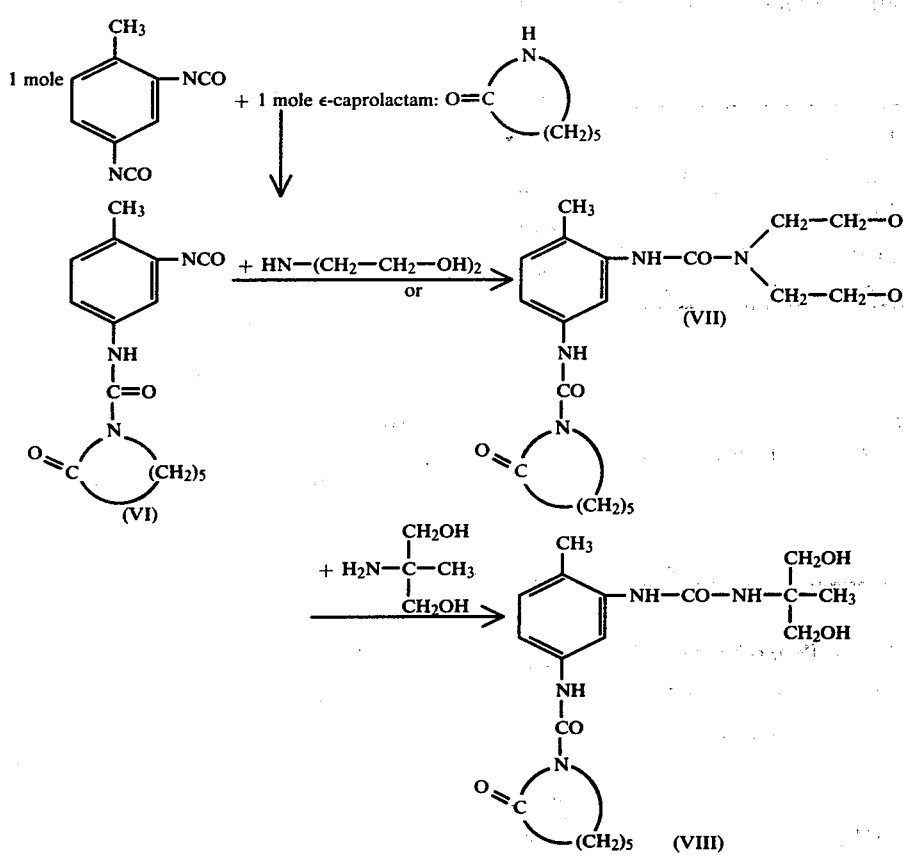

The tetrakis-hydroxyurea IX, which has to be expected as by-product, was prepared from 1 mole of tolylene-2,4-diisocyanate and 2 moles of diethanolamine in dimethylformamide solution at 0° to 5° C. and isolated by precipitation (m.p. 143° C., white powder) with a large quantity of acetone.

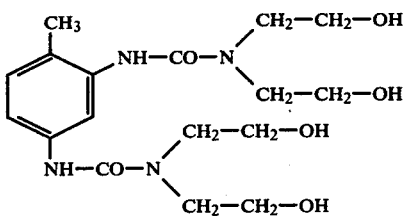

A similar reaction of tolylene diisocyanate with 2-amino-2-methyl-propanediol-(1,3) yields the tetrakishydroxyurea, m.p. 197°–200° C.

To prepare the bis-caprolactam adduct (X) of tolylene diisocyanate, a mixture of equivalent quantities of the starting materials is heated to 90° C. An exothermic reaction sets in which raises the temperature to about 140° C. The product is kept at 90° C. by heating for a further 2 hours. The product is recrystallised from 2 liters of toluene. m.p. 170°–173° C.

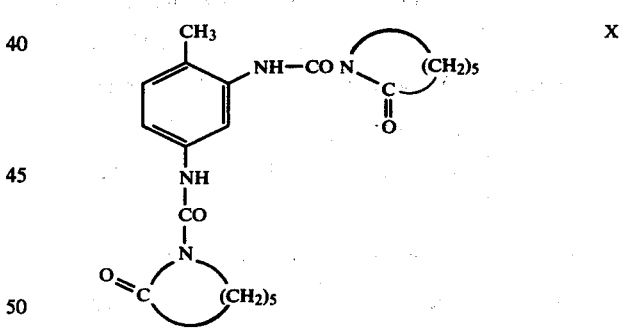

EXAMPLE 6

500 Parts of a polyester of adipic acid, hexane-1,6-diol and 2,2-dimethylpropanediol-(1,3) (molecular weight 1950), 27.82 parts of the monoadduct-diol-VII (100 mVal of crosslinking groups per kg of polyurethane), 10.43 parts of bis-(β-hydroxypropyl)methylamine, 177.5 parts of diphenylmethane-4,4'-diisocyanate and 174 parts of dimethylformamide are reacted together at 40° C. for 80 minutes to form the isocyanate prepolymer (2.82% of NCO in the solid substance).

420 Parts of the isocyanate prepolymer are introduced into a suspension of 6.90 parts of ethylene diamine in 1080 parts of dimethylformamide and 10 parts of solid carbon dioxide with vigorous stirring. A clear, homogeneous, highly viscous elastomer solution (520 poises) is obtained.

Comparison Example (a) No crosslinking groups built in, no addition

An elastomer solution is prepared from the same starting material and by the same process but without the incorporation of the crosslinking group-diol VII. The isocyanate prepolymer obtained has an isocyanate content (in the solid substance) of 2.80%. The chain-lengthened polyurethane solution has a viscosity of 640 poises/22% (328 poises at 20%).

Comparison Example (b) No incorporation of crosslinking groups but the addition of 100 mVal of bis-crosslinking agent X per kg of polyurethane 250 Parts of the 22% elastomer solution free from crosslinking groups according to comparison Example (a) are mixed with 1.15 parts of the bis-caprolactam adduct X ("bis-crosslinking agent") and 25 parts of dimethylformamide with stirring (320 poises).

Comparison Example (c) No incorporation of crosslinking groups but the addition of 200 mVal of X/kg of polyurethane 250 Parts of elastomer solution (a) are mixed with 2.3 parts of X and 30 parts of dimethylformamide with stirring (306 poises).

Comparison Example (d)

When attempts are made to use an isocyanate prepolymer in the same way as in the Example but with the incorporation into its structure of an equivalent quantity of the tetrakishydroxyurea IX (instead of the monoadduct-crosslinker-diol VII), the prepolymer undergoes complete crosslinking even during its formation.

The solutions obtained from the Example according to the invention and from comparison Examples (a) to (c) are used to form films about 0.12 mm in thickness which are dried at 45′/70° C.+45′/100° C. All the films were found to be soluble in dimethylformamide in the cold.

The films were then in addition after-heated at 130° C., for 30, 60, 120 and 180 minutes, respectively.

The film obtained from comparison sample (a) remains soluble (no possibility of crosslinking).

Comparison samples (b) and (c) remain soluble, i.e. uncrosslinked, after 30, 60 and 120 minutes' heating at 130° C. and are only slightly crosslinked after 3 hours' heating at 130° C. (difficult to dissolve in cold DMF). Even after one hour at 150° C., films (b) and (c) are not crosslinked and therefore remain soluble in dimethylformamide at 95° C. (in cold dimethylformamide they only swell strongly). By contrast, the film according to the invention is crosslinked after only 30 minutes at 130° C. and remains insoluble in dimethylformamide even after 20 minutes at 95° C.

This Example illustrates the advantage of the built-in self-crosslinkable structure compared with the known "masked biscaprolactams" and "crosslinking agents".

When the solutions are spun by the wet spinning process through spinning dies having 20 apertures 0.12 mm in diameter into a coagulation bath of 90 parts of water and 10 parts of dimethylformamide heated to 80° C. and the filaments are wound at a rate of about 5 m/min, treated in a water bath at 50° C. and then at 90° C. to remove solvent, dried in air and finally tempered at 130° C. for one hour, the following results are obtained:

| | Titre (dtex) | Strength (cN/dtex) | Elongation (%) | Modulus/ 300% (cN/dtex) | Hot break time at 193.7° C./ 100% (sec.) | Solubility in DMF/20° C. |
|---|---|---|---|---|---|---|
| according to the invention (100 mVal of built-in crosslinking groups per kg) (a) | 309 | 0.65 | 606 | 187 | 96 | insoluble |
| Comparison sample without crosslinking groups (b) | 304 | 0.52 | 530 | 159 | 30 | soluble |
| Comparison sample 100 mVal of bis-crosslinking agent per kg (as additive) (c) | 294 | 0.52 | 540 | 159 | 14 | soluble |
| Comparison sample 200 mVal of bis-crosslinking agent per kg (as additives) | 317 | 0.47 | 537 | 144 | 12.8 | soluble, goes into solution with slight delay |

While the filaments according to the invention containing 100 mVal/kg of built-in crosslinking groups are highly crosslinked (insoluble) and show a considerable improvement in the hot break time, the "bis-crosslinking agent" used as additive does not yet have a crosslinking effect and the hot break times are therefore not improved. To produce a certain amount of crosslinking in (b) and (c) requires a tempering time of one hour at 150° C., but this has a deleterious effect on the other properties and is too slow in practice for a continuous crosslinking process.

If the solutions are spun by the dry spinning process and the solution according to the invention is compared with the solution according to comparison Example (a) which is free from crosslinking agent, the elastomer filaments obtained from the two solutions again differ considerably from each other in their thermal resistance. The hot break time of the filaments which are not crosslinked is 31 seconds (100% elongation at 193.7° C.). This increases to 96.5 seconds in the crosslinked filaments according to the invention. The stability of the filament tension in hot water is also improved.

EXAMPLE 7

(a) Isocyanate prepolymer

500 Parts of a polyester of adipic acid, hexane-1,6-diol and 2,2-dimethyl-propandiol-(1,3) (molar ratio of glycols 65/35) having a molecular weight of 1950, 27.82 parts of the monoadduct-diol (VII), 10.43 parts of bis-($\beta$-hydroxypropyl)-methylamine, 157.5 parts of diphenylmethane-4,4'-diisocyanate and 174 parts of dimethylformamide are reacted together for 95 minutes at 40° C. to form an isocyanate prepolymer (isocyanate content 2.82% in the solid substance).

(b) Chain lengthening with hydrazine hydrate

5 Parts of the isocyanate prepolymer (a) are added with vigorous stirring to 2.89 parts of hydrazine hydrate in 537 parts of dimethylformamide. A clear, highly viscous elastomer solution is obtained (378 poises/22%).

The solution is dried to form films (45' at 70° C. and 45' at 100° C.). The highly elastic films obtained (0.64 cN/dtex tensile strength: 586% elongation at break) are still soluble in dimethylformamide. When they are afterheated at 130° C. for 30 minutes, the films undergo crosslinking and are then insoluble in dimethylformamide (20' at 95° C.).

Elastomer filaments which have been wet spun by the usual process have an excellent hot break time of 100 seconds at 193.7° C./100% elongation after brief drying in a hot air channel at approximately 150° C. This excellent result is due to their crosslinkages.

(c) Reaction with $\beta$-semicarbazido-propionic acid hydrazide 9.30 Parts of $N_2N.NH.CO.NH.CH_2.CH_2.CO.NH.NH_2$ are dissolved in 18 parts of hot water, diluted with 542 parts of dimethylformamide and converted into an elastomer solution (420 poises) within 5 minutes by the addition of 210 parts of the isocyanate prepolymer solution (a).

Parts of the solution are dried to form films (70'/100° C.) The films obtained are highly elastic (tensile strength 0.60 cN/dtex; 590% elongation). They are not yet crosslinked (soluble in dimethylformamide at room temperature). When the films are heated to 130° C. for 30 minutes, they become crosslinked and are then insoluble in dimethylformamide (tested at 95° C. for 20 minutes).

Parts of the solution are wet spun to form filaments (coagulation in an 80/20 mixture of water and DMF at 80° C.). The filaments are after-treated in water at 90° C. for one hour for complete extraction of the solvents and dried in air. They are then still completely soluble in dimethylformamide. The hot break time of these filaments, which is an important criterion for shaping by heat, is only 1 second at 193.7° C./100% elongation, and therefore insufficient. When the elastomer filaments are after-treated by heat, for example by keeping them at 130° C. for one hour or by looping them 10 times over a heating roller heated to 175° C. and rotating at 100 m/min, their hot break time is considerably increased, i.e. to 17.5 seconds.

The filaments have good elastic properties. Tensile strength: 0.72 cN/dtex at 542% elongation; modulus at 300% elongation: 0.29 cN/dtex; hot-water extension (HWE): 20/89/26%; reduction of tension in hot water (RTHW): 0.68 mN/dtex/0.24 mN/dtex/36%.

EXAMPLE 8

200 Parts of a polyester of adipic acid and hexanediol-(1,6)/2,2-dimethylpropane-diol-(1,3) (65/35) (molecular weight 1900), 4.09 parts of N,N-bis-($\beta$-hydroxypropyl)-methylamine, 10.90 parts of the monoadduct-diol VIII, 58.7 parts of diphenylmethane-4,4'-diisocyanate and 68.5 parts of dimethylformamide are reacted together for 95 minutes at 40° C. to produce a prepolymer having an isocyanate content of 1.80%.

A suspension of 1.24 parts of ethylene diamine, 306 parts of dimethylformamide and 2 parts of solid carbon dioxide is reacted with 100 parts of the above isocyanate prepolymer solution to form an elastomer solution.

The elastomer solution is dried to form films which become insoluble in dimethylformamide both at room temperature and at 95° C. after a heat treatment at 130° C. for 30 minutes.

EXAMPLE 9

300 Parts of a polytetramethylene ether diol (molecular weight 2000), 6.15 parts of N,N-bis-($\beta$-hydroxypropyl)-methylamine, 88.41 parts of diphenylmethane-4,4'-diisocyanate and 16.39 parts of the monoadduct-diol VII (approximately 100 mVal of masked isocyanate groups per kg of solid elastomer substance) are reacted with 103 parts of dimethylformamide for 50 minutes at 40° C. and for 90 minutes at room temperature to form the isocyanate prepolymer (isocyanate content 2.36% in the solid substance). 3 Parts of solid carbon dioxide followed by 107.5 parts of the above isocyanate prepolymer solution are added to 1.45 parts of ethylene diamine in 270 parts of dimethylformamide. A homogeneous solution having a viscosity of 234 poises is obtained.

Parts of the solution are dried to form films (70 minutes at 100° C.). Films which have been after-heated at 130° C. for 30 minutes remain insoluble in cold dimethylformamide. The maximum degree of crosslinking is reached after 60 minutes at 130° C. (or 30 minutes at 150° C.). After this treatment, the films remain resistant to dimethylformamide at 95° C. even after 3 hours, i.e. they are still undissolved and their structure is preserved. The tensile strength of the flms is 0.68 cN/dtex for an elongation of 684% and the modulus at 300% elongation is 0.115 cN/dtex.

Another portion of the solution is spun into an 80/20 bath of water and DMF at 80° C., drawn off at 10 m/min and finally freed from solvent in hot water (90° C.). The filaments obtained are still soluble in dimethylformamide. Their tear resistance is 0.64 cN/dtex at 644% elongation and they have a modulus at 300% elongation of 0.15 cN/dtex.

When the response to heat is tested at 193.7° C. under an elongation of 100% (measurement of the hot break time HBT), the filaments break after 10.2 seconds. Although this result is better than that obtained with the comparison sample without the built-in diol crosslinker (2 seconds), it is still not completely satisfactory. If the filaments are then heated to 130° C. for one hour, however, or if they are passed over heating rollers with a surface temperature of 180° C., they become insoluble in DMF and the hot break time rises considerably, to 36.3 seconds at 193.7° C. This is sufficient for thermal shaping processes.

When the filaments (without thermal after-treatment) are tested for their heat distortion temperature, they are found to have the very high value of 193.5° C. They reach this high value owing to the crosslinking which takes place during the relatively slow measurement process. Similar crosslinking also occurs during the usual treatment of elastic knitted fabrics in tentering frames (for example 20 to 30 seconds at 180° to 195° C.

Comparison experiment

A polyurethane is synthesised as described above but without the addition of the monoadduct-diol VII (and without its equivalent quantity of diphenylmethane-4,4'-diisocyanate). Films obtained from this solution cannot be crosslinked. Wet-spun filaments have a considerably poorer hot break time (2 seconds or less) and remain soluble.

We claim:
1. A process for the preparation of a solution of a polyurethane which is self-crosslinkable through masked isocyanate groups comprising reacting at least one long chain dihydroxy compound having a molecular weight of substantially 600 to 6000 with an excess of at least one organic diisocyanate in the presence of at least one isocyanate adduct diol having the formula:

M—CO—NH—D'—NH—CO—A, wherein
M is a diol containing residue derived by reaction of the active N-hydrogen of an aminodiol or a hydrazinodiol which contains a primary or secondary amino group, with an isocyanate group;
D' is the divalent residue of an organic diisocyanate; and
A is an isocyanate masking group,
to form a substantially linear modified isocyanate prepolymer containing from 0.1 to 10% by weight, based on the solids content, of isocyanate adduct diol in combined form; and then reacting the product with a chain lengthening agent in a solvent.

2. The process according to claim 1, wherein said chain lengthening is carried out with a diol or with water.

3. The process according to claim 1, wherein said chain lengthening is carried out with a compound having a molecular weight of from 32 to 400 which has N-H-active end groups.

4. The process according to claim 3, wherein said chain lengthening is carried out with a diamine, aminoalcohol, dihydrazide compound or hydrazine.

5. The process according to claim 1, wherein said isocyanate adduct diol used for incorporation into the molecular structure is represented by the following general formula:

M—CO—NH—D'—NH—CO—A in which M is a group represented by the following formula:

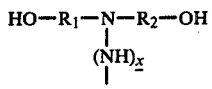

wherein $R_1$ and $R_2$, are identical or different and represent a straight chain or branched alkylene group having up to 12 C-atoms or a cycloalkylene group, and $x$ represents 0 or 1.

6. The process according to claim 5, wherein $R_1$ represents the group

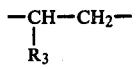

wherein
$R_3$ is hydrogen or $C_1$–$C_4$-alkyl,
$R_2$ represents a straight chain or branched chain alkylene group having up to 12 C-atoms or a cycloalkylene group, and $x$ is 0.

7. The process as claimed in claim 6, wherein $R_3$ is methyl.

8. The process according to claim 1, wherein said isocyanate adduct diol used for incorporation into the molecular structure is represented by the general formula:

M—CO—NH—D'—NH—CO—A in which M is a group represented by the following general formula:

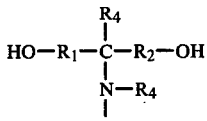

wherein $R_1$ and $R_2$ are identical or different and represent a straight chain or branched alkylene group, having up to 12 C-atoms or a cycloalkylene group, and $R_4$ represents hydrogen and/or $C_1$–$C_4$-alkyl.

9. The process according to claim 8, wherein $R_4$ is methyl.

10. The process according to claim 1, wherein D' represents a divalent group which is derived from diphenylmethane-4,4'-diisocyanate, tolylene-2,4-diisocyanate, tolylene-2,6-diisocyanate, phenylene-1,3-diisocyanate, phenylene-1,4-diisocyanate or diphenylether-4,4'-diisocyanate.

11. The process according to claim 1, wherein said isocyanate masking group A is derived from a phenol, acetoacetic ester, malonic ester, acetylacetone, phthalimide, benzene sulphonamide, 2-mercaptobenzothiazole, hydrocyanic acid or a lactam.

12. The process according to claim 1, wherein said isocyanate masking group A is derived from pyrrolidone, α-piperidone, ε-caprolactam, methylcaprolactam, γ-ethyl caprolactam or γ-tert.-butyl caprolactam.

13. A polyurethane solution prepared by a process according to claim 1.

14. A process for the preparation of a polyurethane shaped product, wherein a polyurethane solution according to claim 13 is processed into a shaped product and crosslinking is effected by heat during or after shaping.

15. A process according to claim 14, wherein said shaped product is a foil, filament or coating.

16. A polyurethane shaped product prepared by a process according to claim 14.

* * * * *